United States Patent [19]
Ellis et al.

[11] 3,754,768
[45] Aug. 28, 1973

[54] HEIGHT CONTROL VALVE FOR VEHICLE LEVELING

[75] Inventors: George S. Ellis, Roseville; Bernard J. Finn, Troy; Charles H. Pinx, Sterling Heights, all of Mich.

[73] Assignee: General Motors Corporation, Detroit, Mich.

[22] Filed: Apr. 19, 1972

[21] Appl. No.: 245,498

[52] U.S. Cl. ............... 280/6 R, 280/124 F, 251/6, 251/9, 137/625.2
[51] Int. Cl. ............................................. B60s 9/10
[58] Field of Search......... 280/6 R, 6 H, DIG. 1 LR, 280/124 F, 124 R; 137/625.2; 251/6, 7, 9

[56] References Cited
UNITED STATES PATENTS
3,054,425   9/1962   Pribonic.................... 280/DIG. 1
3,693,932   9/1972   Blohm..................... 251/6
2,985,192   5/1961   Taylor et al................. 251/7

Primary Examiner—Philip Goodman
Assistant Examiner—John A. Carroll
Attorney—W. S. Pettigrew and J. C. Evans

[57] ABSTRACT

A vehicle height control valve operated in response to vehicle movement includes a housing having a cavity therein with generally circular walls against which an elongated tubing member is supported in juxtaposed relationship. The tube has two ends adapted to be connected to first and second pressure sources and is connected to an output fitting at a point intermediate the tube end. A roller assembly with angularly spaced apart roller elements engages the tubing member to control flow therethrough. A torsion shaft that operates the roller assembly twists to prevent movement of the roller assembly from a centered frictional engagement with the tube thereby to prevent valve operation in response to ordinary vehicle road movements.

4 Claims, 8 Drawing Figures

Patented Aug. 28, 1973

HEIGHT CONTROL VALVE FOR VEHICLE LEVELING

This invention is directed to height control valves for controlling fluid flow between a pressure source and a variable volume height controlling leveler unit in a vehicle suspension system and more particularly to vehicle leveling units of the type including means for damping input from the vehicle to the valve in response to ordinary road movement.

Height control valves for vehicle leveling systems are connected between the sprung anf unsprung mass portions of the vehicle and are moved into a plurality of control positions when the sprung mass portions of a vehicle are moved with respect to the unsprung mass portions thereof.

Valves of this type often include a damper mechanism associated therewith which will isolate the valve from vehicle movements which are produced in response to ordinary road movements. These vehicle motions are of a high frequency and low amplitude and typically, a hydraulic damping mechanism of the dashpot type is located between a valve actuating lever and valving components within the height responsive device in order to prevent ordinary road movement from initiating a leveling phase of operation.

Valves of this type are further characterized by including components that will be operated following a change of load on the vehicle. For example, when an increased load is placed on the sprung mass of the vehicle so as to move it below a desired height relationship with the unsprung mass of the vehicle, the damping mechanism is overridden and a fill valve in the height responsive valve device will be operated to direct presurized fluid into a control chamber of a leveler unit to return the vehicle to the ehight relationship desired.

Likewise, when the vehicle is unloaded, the sprung mass thereof will be raised above the desired height relationship for a period of time to override the action of the damping mechanism thereby causing an exhaust valve in the device to be conditioned to direct pressurized fluid from the leveler unit to cause the sprung mass to be lowered back to a desired height relationship with respect to the unsprung mass of the vehicle.

A further aspect of valves of this type is that the valve will include internal stops at the extremes of valve operation. In some vehicle suspensions, there is an extreme travel condition which will cause the valve operating lever to move past the point which represents the extreme stop positions within the valve. Overtravel mechanisms are included between the valve operating lever and the valve to permit such travel.

An object of the present invention is to maintain pressure within a leveler unit of a vehicle leveling system during normal vehicle road movements by means of a three position height control valve having a vave actuating lever that is angularly shifted in response to normal vehicle road movement and restrained valve means which twist a torsion shaft connected to the actuating lever to prevent operation of the restrained valve means in response to normal vehicle road movements.

A further object of the present invention is to provide an on-off type vehicle height control valve operated by means for pinching the flow through a flexible tube wherein a torsion shaft is connected between a valve actuating lever and the means for pinching the tube to prevent changes in flow through the flexible tube in response to ordinary road movements between the sprung and unsprung mass of the vehicle.

A still further object of the prsent invention is to improve a vehicle height control valve of the type having a resilient tube therein adapted to be connected between a pressure source and a leveler unit and operated opened and closed by a member movable into engagement with the walls of the tube by shaping a tube support cavity wall to prodice a progressive pinched throttling of the tube by the member in response to height variations between the sprung and unsprung mass of the vehicle due to load changes thereon and whereby the tube and member constitute a restrained valve means that twists a torsion shaft connected between the member and a valve operating lever to prevent ordinary road movements from operating the valve.

Yet another object of the present invention is to provide an improved height control valve for vehicle leveling including a resilient tube member which is selectively squeezed to control fluid flow between a pressure source and a leveler unit and wherein the valve tube member is squeezed by a roller on the end of an oscillating member connected by means of a torsion shaft to a valve actuating lever and wherein the torsion shaft twists to prevent movement of the roller with respect to the flow controlling tube in response to normal vehicle road movements.

These and other objects of the present invention are obtained in one working embodiment which has a valve mounted on a vehicle frame cross member and has a valve actuating lever attached to the upper control arm of the vehicle by means of a connecting link.

The valve includes a tube support cavity wall arranged concentrically with respect to a first axis offset with respect to a second axis defined by a torsion shaft journaled in the valve housing.

The cavity walls have a flow tube in juxtaposed supported relationship therewith. A V-shaped arm is located within the cavity at a point radially inwardly of the tube and the cavity wall. The V-shaped arm carries a pair of angularly spaced roller members each of which engages the outer surface of the tube. The V-shaped arm juncture is fixed to one end of the torsion shaft which is designed to have a controlled amount of compliance or twist when the shaft is subjected to a predetermined torque.

The V-shaped arm is located so that the path of the center of the rollers and the tube support cavity wall, against which the tube is squeezed by the rollers, are arranged as eccentric circles.

The V-shaped arm is positioned in a centered neutral position when the vehicle is level and the rollers pinch the tube against arcuate segments of the wall cavity thereby defining restrained valve means which resist movement of the rollers from the centered neutral position. This resistance to movement is negligible except when the valve mechanism is rapidly accelerated. Under these conditions, the resistance to movement is maintained at a level which will cause the torsion shaft to twist for a predetermined period of time which is sufficient to prevent ordinary road movements of low amplitude and high frequency from operating the valve. The torsion shaft along with the restrained valve means thus constitutes a valve damper for holding the valve rollers in a netural or centered position during normal road opertions.

Under conditions where the vehicle is either loaded or unloaded so as to impose a sustained load change on the sprung mass of the vehicle, the torsion shaft is maintained under an increasing torque which will eventually overcome the resistance between the rollers and an adjacent tube sections and will thereby cause the rollers to move arcuately within the cavity. One of the rollers will maintain a progressive pinching action on one segment of the tube to prevent flow between one of the tube ends and the outlet fitting of the valve and the other of the rollers will progressively increase the flow through the other tube portion to communicate the outlet of the valve with the other pressure source to affect a change of volume of fluid within the leveler unit which compensates for a load change on the vehicle.

The height control valve thus can be characterized as using the roller components therein as combined valving and damping components in the system which will respond to sustained load changes to produce a change in the fluid volume within a leveler unit while damping out ordinary raod movements to prevent changes in the volume of fluid in the leveler unit during normal road movement.

Further objects and advantages of the present invention will be apparent from the following description, reference being had to the accompanying drawings wherein a preferred embodiment of the present invention is clearly shown.

Figure 1:
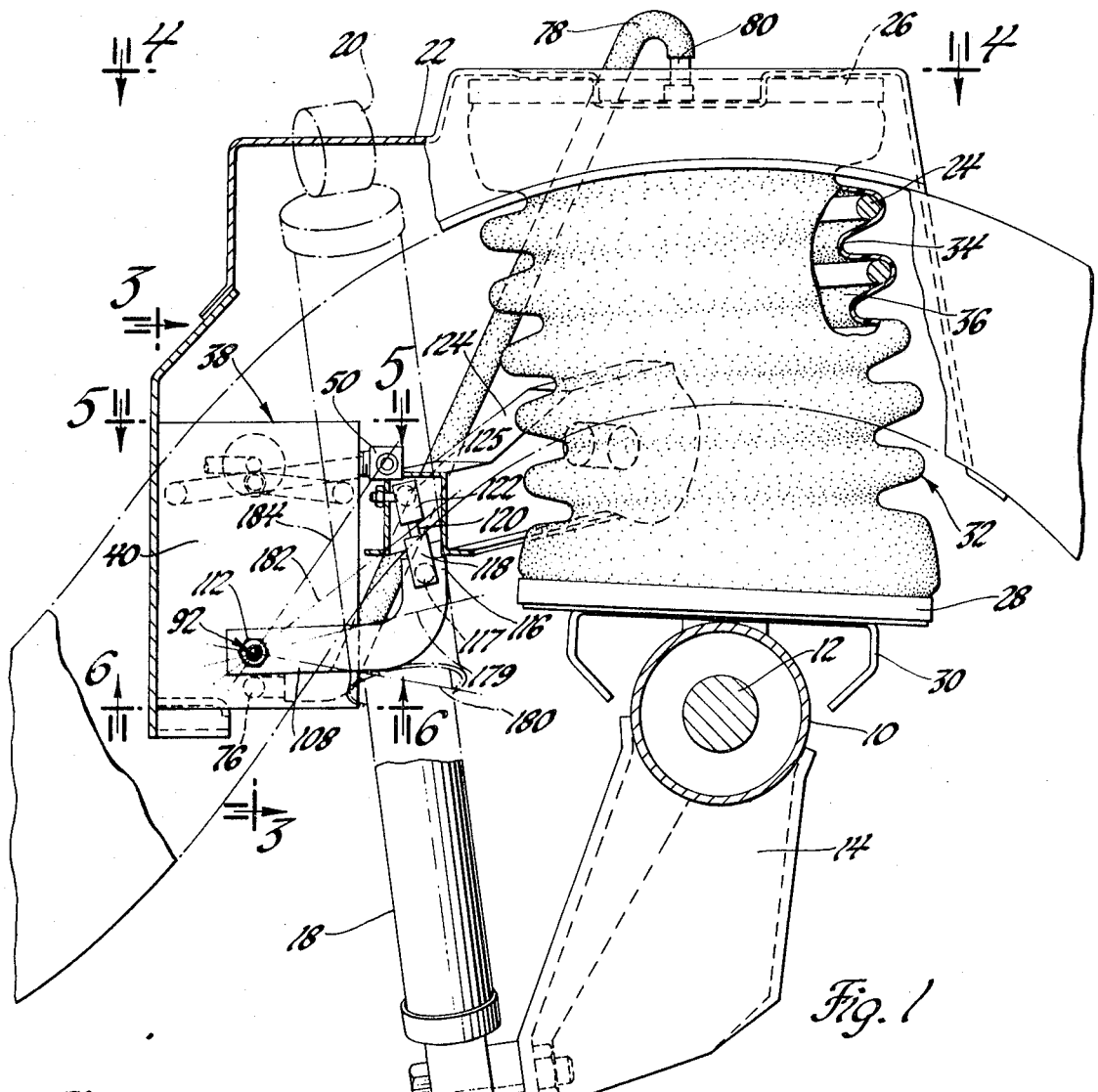
FIG. 1 is a view in elevation of a portion of the rear suspension of a vehicle including the present invention.

Referring now to the drawings, FIG. 1 shows a typical vacuum leveling installation for maintaining a predetermined height relationship between the sprung and unsprung mass of the vehicle.

In FIG. 1 the unsprung mass is represented by an axle housing 10 having an axle 12 of the type normally having tire and wheel, ground engaging unsprung components, connected at either end thereof.

A depending bracket 14 on each end of the axle housing 12 is secured by means of a connector assembly 16 to one end of a hydraulic shock absorber 18 which has the opposite end thereof connected by suitable fastening means 20 to a portion of a cross frame member 22.

The cross frame member 22 represents the sprung portion of the vehicle. More particularly, it is resiliently supported by a pair of coil springs 24 each having one end thereof supported by an upper seat 26 on the frame 22 and the lower end thereof supported by a lower seat 28 on a bracket 30 from the axle housing 10.

Each spring 24 is enveloped by a flexible, vacuum operated bellows type sleeve 32 which has convolutions 34 therein which fit over the outer periphery of each of the coils of spring 24. The bellows sleeve 32 and seats 26, 28 define a sealed control chamber 36 which is adapted to be connected to a pressure source, in the illustrated embodiment, a subatmospheric vacuum source. This causes the sleeve 32 to pull the spring seats 26, 28 together thereby to move the cross frame member 22 toward the housing 10 so as to maintain a designed height relationship therebetween.

A design position is maintained under the control of an improved vehicle height control valve assembly 38 which includes a housing portion 40 mounted to the cross frame member 22.

The valve housing 40 includes a cover 42 held in place thereon by means of screws 44.

The cover 42 encloses a roller assembly 46 which is supported within a valve cavity 48 for controlling fluid flow between two pressure sources. In the illustrated arrangement, the pressure sources are ambient air and manifold vacuum.

Manifold vacuum is adapted to be connected to a vacuum fitting 50 connected on one side of the housing portion in communication with a housing bore 51.

The valve is connected to a second pressure source represented by ambient air pressure to an air filter 52 which is connected by means of a conduit 54 to an air inlet fitting 56 on one end of a vacuum regulator valve 58.

An air outlet fitting 60 on the regulator 58 is connected by means of a conduit 62 to an air inlet fitting 64 on the housing.

The vacuum fitting 50 has a side port 68 therein connected by means of a conduit 70 to a vacuum inlet 72 on the opposite side of the housing portion 40 from the air inlet fitting 64 thereon.

The leveling system further includes a tee fitting 74 having an outlet fitting 76 thereon connected to one end of a supply and exhaust conduit 78 which has the opposite end thereof connected to a fitting 80 which leads to and from the control chamber 36 of the leveler unit defined by the bellows sleeve 32.

Figure 6:
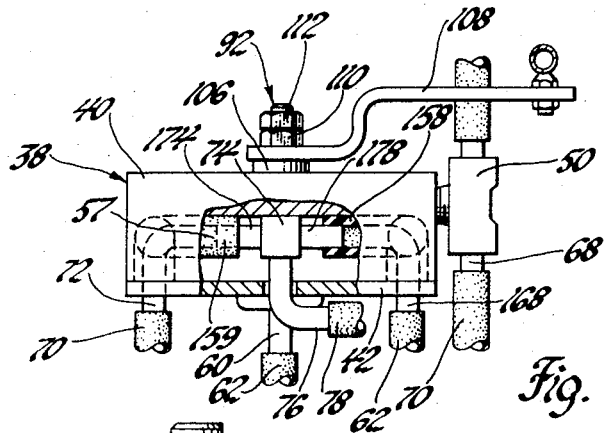
FIG. 6 is a horizontal sectional view taken along the line 6—6 of FIG. 1 looking in the direction of the arrows.
Figure 7:
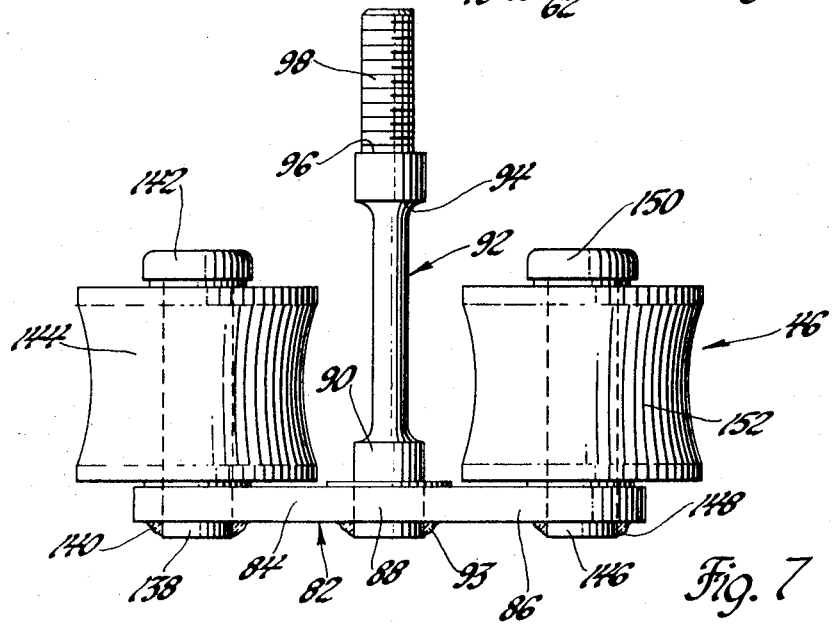
FIG. 7 is a top elevational view of a roller assembly in the valve of FIG. 2.
Figure 8:
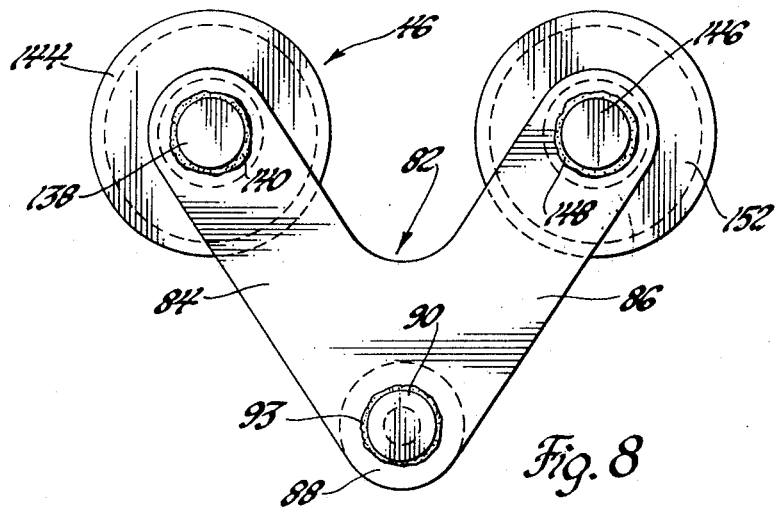
FIG. 8 is a front elevational view of the roller assembly of FIG. 7.

Referring now more particularly to FIGS. 6 and 7, the roller assembly 46 is illustrated as including an oscillatable V-shaped arm 82 having angularly spaced legs 84, 86 thereon joined at a juncture 88. The juncture is connected to a large diameter end portion 90 of a torsion shaft 92 by a weld 93. The opposite end of the shaft 92 has an enlarged diameter portion 94 thereon which forms a shoulder around a lever support surface 96 inboard of a threaded end 98 on the torsion shaft 92.

Figure 3:
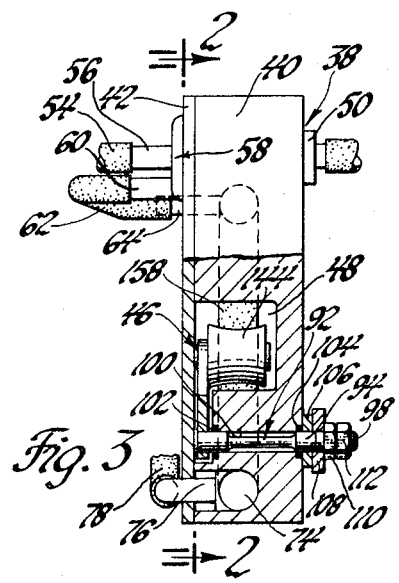
FIG. 3 is a vertical sectional view taken along the line 3—3 of FIG. 1.
Figure 4:
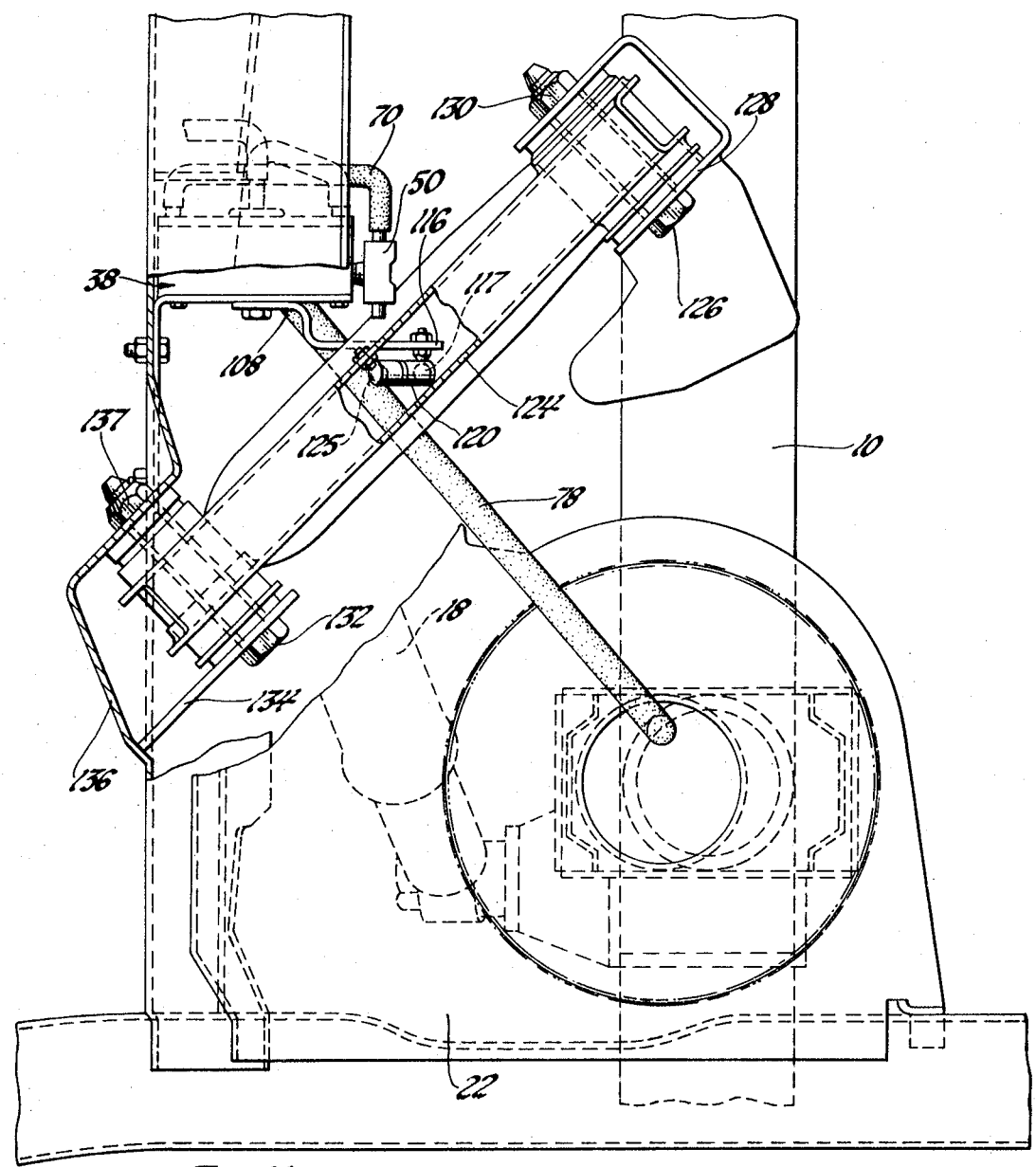
FIG. 4 is a view in horizontal section taken along line 4—4 of FIG. 1 looking in the direction of the arrows.
Figure 5:
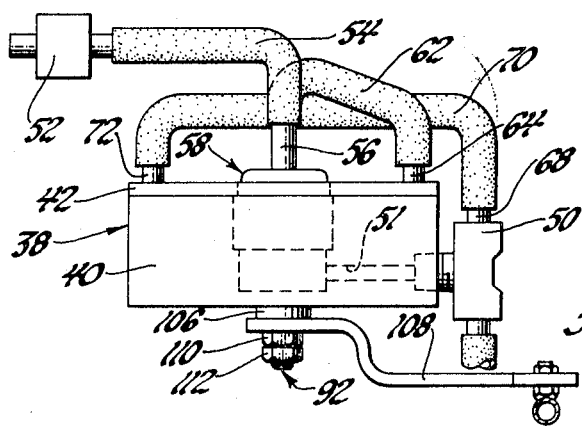
FIG. 5 is a horizontal sectional view taken along the line 5—5 of FIG. 1.

As best illustrated in FIG. 3, the torsion shaft 92 extends through a housing bore 100 and has the large diameter end portions 90, 94 thereon journaled within the housing at the bore 100.

These end portions are sealed resectively by O-rings 102, 104 supported within the housing portion 40 therearound at opposite ends of the bore 100.

The large diameter portion 94 is located outboard of the housing and supports a washer 106 which spaces a valve operating lever 108 outwardly of the housing portion 40.

The lever support surface 96 on the torsion shaft 92 extends through an end opening of the lever 108 and a pair of nuts 110, 112 are threaded on the end 98 into engagement with the outer face of the lever 108 for fixedly securing it on the end of the torsion shaft 92.

In the illustrated arrangement, the lever operating arm 108 has an L configuration which in FIG. 1 is shown as extending to one side of the valve 38 and upwardly toward the cross frame member 22. The upwardly extending end 116 of the operating lever 108 is fixed by a ball socket joint 117 to one end 118 of a turn buckle 120 which has the opposite end 122 thereon fastened to a portion of a control arm 124 by a ball socket 125.

The control arm 124 more particularly has one end thereon pivotally connected by a bolt assembly 126 which is directed through a bracket 128 on the axle housing 10 to define one pivot point on the control arm 124. The bolt 126 is held in place by means of a nut 130.

A pivot point on the opposite end of the lever 124 is defined by a bolt 132 directed through a bracket 134 on a frame member 136. A nut 137 holds the bolt 132 in place thereon.

The frame member 136 is connected to the cross frame member 22. The bracket 128 on the bracket 30 represents an unsprung portion of the vehicle. It moves with respect to the sprung portion of the vehicle represented by the cross frame member 136 in response to vehicle road movements.

The control arm 124 thereby moves up and down to carry the bent end 116 of the lever 108 angularly with respect to the longitudinal axis of the torsion shaft 92.

In accordance with certain principles of the present invention, this angular movement of the lever will cause oscillation of the V-shaped arm 82 within the control cavity 48.

Each of the legs 84, 86 of the roller assembly 46 carries a tube engaging roller. A shaft 138 has one end thereof fixed by a weld 140 to the upper end of the leg 84. It extends perpendicularly with respect to the V-shaped arm and includes an enlarged head portion 142. A roller 144 is located on the shaft 138 and is held in place thereon by the head 142 and the leg 84. It is free to rotate with respect to the shaft 138 as the roller assembly is oscillated by the torsion shaft 92 within the cavity 48.

Likewise, a shaft 146 has one end thereof secured by a weld 148 to the end of the leg 86. It extends perpendicularly with respect to the leg 86 and includes an enlarged head 150. A roller 152 is supported on the shaft 146 and is held thereon by the head 150. The roller 152 likewise is free to rotate with respect to the shaft 146 upon roller assembly oscillation.

Figure 2:
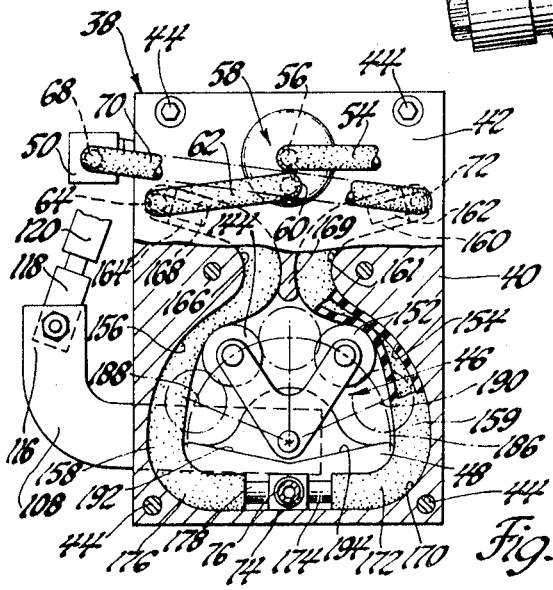
FIG. 2 is a vertical sectional view taken along line 2—2 of FIG. 3 showing a valve in various control positions.

As is best illustrated in FIG. 2, the path of the centers of the roller shafts 138, 146 and arcuate segments 154 and 156 of the housing are formed as eccentric circles.

The arcuate segments 154, 156 serve as a tube support surface which is in juxtaposed relationship with the outer circumference of the elongated flexible tubes 158, 159. The tube 159 includes a first end portion 160 in a groove 161 which is connected to an elbow 162 which has one end thereof fit in the end 160 of tube 159 and the opposite end thereof defining the vacuum inlet 72.

The tube 158 includes an end 164 thereon which is supported in a housing groove 166. The end 164 is connected to one end of an elbow 168 which has the opposite end thereof directed from the housing to define the air inlet fitting 64.

Both the grooves 161, 166 are formed on a reverse curve with respect to the arcuate segments 154, 156 of the cavity walls. The housing includes a divider wall 169 between the grooves 161, 166 to maintain the tube in this reverse curve configuration.

The tube segment 158 extends from its supported juxtaposed realtionship with the cavity wall 156 into a tube groove 170 where it has an end portion 176 thereon connected to an end 178 of the tee 74.

Likewise, the tube portion 159 is directed from the arcuate segment 154 into the opposite end of tube groove 170 where the opposite end 172 thereon is fit over an end 174 of the tee 74.

The valve operating lever 108 has a normal design position which is indicated by line 179 in FIG. 1. When the vehicle is unloaded, the upper control arm 124 will be moved so as to shift the valve operating lever 108 into a rebound position represented by the line 180 in FIG. 1. When the vehicle is oscillating from a normal design position opposite to the rebound direction it will assume a maximum normal compression position represented by the line 182 in FIG. 1. Under extreme loading conditions, there can be metal-to-metal contact between component parts of the suspension. When this occurs, the actuating lever 108 will assume the position represented by the line 184 in FIG. 1.

When the height control valve is in the normal design position which is illustrated in FIG. 2 in solid lines, the V-shaped arm 82 is located in a centered position within the cavity 48. In this location, the angularly spaced rollers 144, 152 each engage a portion of the tube segments 158, 159.

The roller 144 will pinch the tube segment 158 closed against the adjacent arcuate wall segment 156 and the roller 152 will likewise pinch the tube segment 159 closed against the adjacent arcuate segment 154 on the wall cavity. Since the arcuate segments 154, 156 are formed eccentrically with respect to the path 186 generated by the centers of the rollers any movement to either side of the centered design position of FIG. 2 will cause one or the other of the rollers 144, 152 to produce a further pinching action. Thus, as the rollers roll along the tube causing it to become progressively more compressed between the roller and an adjacent arcuate segment, there is a resultant resisting force produced thereon which can be broken into radial and tangential components. An additional inertial force is produced on the roller assembly. It is proportional to the mass of the roller and arm and is dependent upon the acceleration of the roller arm from its centered design position.

The inertial forces are negligible except when the roller assembly mechanism is forced to move rapidly from its design position. The condition occurs during normal road movements between the unsprung and sprung mass which include a wheel hop frequency in the order of 600 cycles per minute. The combination of the tangential forces between the rollers and the tube and the inertial forces of the assembly 46 will act on one end of the torsion shaft 92. On the opposite end of the torsion shaft the force of the spring suspension will act through the lever 108. The combination of these forces will produce a given torque that can cause a predetermined amount of twist in the torsion shaft 92 for damping out ordinary high frequency low amplitude movements between the sprung and the unsprung mass to prevent them from reaching the rollers.

Under static situations the forces on the torsion shaft 92 will be equal to zero and the shaft will be maintained in an equilibrium position represented by the design position of FIG. 2. In dynamic cases, the internal forces; namely the tangential force between the rollers and the tubes 158, 159 and the inertial forces will increase with increased acceleration of the assembly 46. When the combination of these forces reach a certain level, the shaft twists instead of permitting the roller assembly to rapidly move between open and closed positions.

The torsion shaft 92 is carefully sized to enable it to be twisted when the roller assembly 46 is rapidly accelerated thereby to produce isolation of the roller assembly from rapid normal road movements between the sprung and the unsprung mass.

The proper shaft size for a certain torque can be calculated by the following equations. Equation (1), in which $\tau$ is shear stress, $T$ is torque, $d$ is shaft diameter, and $J$ is the polar moment of inertia of the shaft, $$\tau = (T\,d/2\,J) \quad (1)$$

can be rearranged and another expression for $J$ ($J = (\pi d^4)/32$) substituted to yield equation (2), $$d^3 = (T \times 16)/(\pi \times \tau) \quad (2)$$

Using this equation with the maximum allowable shearing stress ($\tau$) and the torque that is available (T) will yield the proper shaft diameter (d). The length of shaft to be used to give a desirable angle of twist can be calculated from equation (3).

$$L = (\theta\,J\,G)/T \quad (3)$$

where $\theta$ is the angle of twist in radian, $G$ is the torsional modulus of elasticity, and $L$ is the length of the shaft.

When the torsion shaft is sized as indicated above, internal forces produced by the inertia of the roller assembly 46 and the tangential forces produced by the rollers moving along the inside diameter of the tube segments 158, 159 will be sufficient to, along with the suspension forces on the opposite end of the torsion shaft, cause it to twist up along its axis without movement of the roller assembly 46 from its designed position.

In order to get movement from the designed position, there must be a sustained load change on the vehicle.

For example, when additional load is removed from the vehicle the springs 24 will be relaxed and the operating lever 108 will be moved toward its rebound position 180. The sustained force of the suspension will cause the roller assembly 46 to move into the dotted line rebound position indicated by reference numeral 188 in FIG. 2. At this point, the roller 144 will have progressively throttled flow through the tube section 158 whereby atmospheric pressure from the air inlet line 64 is blocked from the outlet fitting 74. Concurrently, the roller 152 has moved out of engagement with the tube segment 159 to a position in line with the divider 169 where it no longer pinches the tube segment 159 against the adjacent arcuate wall segment 154 whereby the fitting 74 is fully communicated with the vacuum source which is maintained at a constant vacuum under the control of regulator 58. This controlled vacuum source hence reduces the pressure within the control chamber 56 causing the bellows sleeves 32 to draw against the coil springs 24 to compress them and thereby return the sprung portion of the vehicle downwardly toward a desired predetermined height relationship with respect to the unsprung portion thereof represented by the axle housing 10.

Conversely, when the vehicle is loaded so as to produce a sustained increased load change thereon, the coil springs 24 are compressed causing the vehicle to move into a maximum compressed position which causes the roller assembly to assume the position 190 illustrated in FIG. 2. When this occurs, the roller 144 will be positioned out of engagement with either of the tube segments. The roller 152 will progressively throttle down against the tube 159 to close it against the arcuate wall segment 154. When this occurs, the fitting 74 is disconnected from the vacuum source and it is connected to atmospheric pressure through the air pressure fitting 64. Accordingly, the pressure will increase within the leveler unit control chamber 36 and will reduce the pull down action of the bellow sleeves 32 on the coil springs 24. Accordingly, there will be a greater uplifting force on the seat 26 thereby to cause the sprung mass of the vehicle to move upwardly with respect to the unsprung portion to return the more heavily loaded sprung mass back to a desired height relationship with respect to the unsprung mass of the vehicle.

The roller assembly 46 and tube segments 158, 159 thereby together define a restrained valving mechanism which under conditions of rapid acceleration of the roller assembly 46 will serve to damp movement of the roller assembly 46 because a force is produced on one end of the torsion shaft which will cause it to twist in response to high frequency low amplitude movements of the operating lever 108 which are produced upon normal road movements between the sprung and unsprung mass of a vehicle.

At extremes of valve movement, the rollers 144, 152 will move into engagement with stops 192, 194 formed in the valve housing on either side of the cavity 48.

In accordance with certain other principles of the present invention, the torsional compliance in the shaft 92, in addition to preventing movement of the roller mechanism 46 upon rapid accelerations as produced under road movement conditions, also will twist to compensate for movement between the maximum compression position line 182 and the metal-to-metal line 184 of FIG. 1 without causing yielding in the shaft. Thereby the torsion shaft serves as an over-travel device to make up for the difference between the limit of the valve travel and the limit of the suspension travel in cases where such compensation is required.

In the working embodiment, movement of a roller mechanism 46 between the design position and maximum valve rotation is in the order of 24° while the maximum travel to the stop positions 192, 194 is in the order of 34°. If the suspension were to move to the metal-to-metal compressed condition, the valve rotation is in the orer of 42°. In this case, the excess lever travel is taken up by further torsional compliance in the torsion shaft 92. In the case of suspension rebound movement, when the control arm moves down with respect to the body, the shaft is never forced to wind up.

The angle of the V arm between the legs 84,86 can be varied from about 70° as shown to about 40°. Smaller included angles between the legs 84, 86 increase the sensitivity of the valve and also increase the valve travel between the centered design position and either end stop to about 46°. Under this condition, the valve shaft would not be forced to wind up for overtravel protection.

While the embodiments of the present invention, as herein disclosed, constitute a preferred form, it is to be understood that other forms might be adopted.

What is claimed is as follows:

1. A height control valve for a vehicle leveling system comprising: a housing having a cavity therein, means forming a fluid flow path having a first open end thereon extending from said cavity adapted to be connected to a first pressure source and a second end thereon extending from said cavity adapted to be connected to a second pressure source, an outlet fitting connected to said fluid flow path between said first and second ends thereof adapted to be connected to a vehicle leveler unit, oscillatable valve means within said cavity producing an inertial force in response to ordinary vehicle road movements, a torsion shaft extending through said cavity having one end thereof fixedly secured to said oscillatable valve means, a valve operating lever connected to the other end of the shaft adapted to be connected to a vehicle suspension to operate said shaft and valve means in response to vehicle movements, said valve means including means moved upon oscillation of said shaft to selectively control fluid flow between each of said pressure sources and said outlet fitting, said shaft having a first centered position wherein said valve means is positioned to prevent fluid communication between each of the pressure sources and said outlet fitting to the leveler unit, said shaft having a rebound position wherein said valve means is positioned to open one of the pressure sources to said outlet fitting while the other of the pressure sources is closed, said shaft being movable to a third position wherein the oscillatable valve means is moved to a third position to disconnect said one of said pressure sources from the outlet while connecting the other of said pressure sources to the outlet, said shaft having a torsional compliance which causes said shaft to twist between the valve operator and the oscillator valve means when said oscillatable member is moved in either direction from its centered position in response to ordinary road movements, said torsional twist of said shaft being of a magnitude to mechanically damp out small amplitude high frequency input movements to the shaft whereby the oscillatable valve means is held in its centered position to prevent communication between the outlet of the valve and the first and second pressure sources during normal road movements.

2. A height control valve for a vehicle leveling system comprising: a housing having a cavity therein, means forming a fluid flow path having a first open end thereon extending from said cavity adapted to be connected to a first pressure source and a second end thereon extending from said cavity adapted to be connected to a second pressure source, an outlet fitting connected to said fluid flow path between said first and second ends thereof adapted to be connected to a vehicle leveler unit, oscillatable valve means within said cavity producing an inertial force in response to ordinary vehicle road movements, said valve means including a roller member and a tube located in juxtaposed relationship with said roller member, said tube member forming part of said fluid path, a torsion shaft extending through said cavity having one end thereof fixedly secured to said oscillatable valve means, a valve operating lever connected to the other end of the shaft adapted to be connected to a vehicle suspension to operate said shaft and valve means in response to vehicle movement, said valve means roller being moved upon oscillation of said shaft to selectively engage said tube to control fluid flow between each of said pressure sources and said outlet fitting, said shaft having a first centered position wherein said roller is positioned on said tube to prevent fluid communication between each of the pressure sources and said outlet fitting to the leveler unit, said shaft having a rebound position wherein said roller is positioned on said tube to open one of the pressure sources to said outlet fitting while the other of the pressure sources is closed, said shaft being movable to a third position wherein the oscillatable valve means roller is moved to a third position on said tube to disconnect said one of said pressure sources from the outlet while connecting the other of said pressure sources to the outlet, said shaft having a torsional compliance which causes said shaft to twist between the valve operator and the oscillator valve means when said oscillatable member is moved in either direction from its centered position in response to ordinary road movements, said torsional twist of said shaft being of a magnitude to mechanically damp out small amplitude high frequency input movements to the shaft whereby the oscillatable valve means is held in its centered position to prevent communication between the outlet of the valve and the first and second pressure sources during normal road movements.

3. A height control valve for a vehicle leveling system comprising: a housing having a cavity therein with a wall having an arcuate segment thereon, a tube located within said cavity in support juxtaposed relationship with said cavity wall segments, said tube having a first open end thereon extending from said cavity adapted to be connected to a first pressure source and a second end thereon extending from said cavity adapted to be connected to a second pressure source, an outlet fitting connected to said tube between said first and second ends thereon adapted to be connected to a vehicle leveler unit, an oscillatable member within said cavity having first and second leg portions thereon joined together at one end thereof at a juncture point, a torsion shaft having one end thereof fixedly secured to said oscillatable member for moving said oscillatable member, a valve operating lever connected to the other end of said shaft, said arms each having a roller pivotally supported thereon, each of said rollers having centers with a path eccentric to that of said arcuate wall segments to engage the outer periphery of said tube member and being movable with respect thereto on oscillation of said shaft to selectively control fluid flow between each of said pressure sources and said outlet fitting, said shaft having a first centered position wherein said rollers are located against a portion of said tube member to pinch said tube member between said rollers and said cavity wall to prevent fluid communication between each of the pressure sorces and said outlet fitting to the leveler unit, said shaft having a rebound position wherein one of said rollers is moved in a direction away from said cavity wall to open one of the pressure sources to said outlet fitting while the other of said rollers is moved toward said cavity wall against a resistance established by an interference fit between said other roller and a segment of the tube which is pressed closed between said other roller and the cavity wall to close the other of said pressure sources, said shaft being movable to a third position wherein the oscillatable member is moved to a third position wherein said other of said rollers is moved away from said cavity wall while said one of said rollers is moved into proximity with said cavity wall against a resistance established by an interference fit between said one roller and said tube to disconnect said one of said pressure sources from the outlet while connecting the other of said pressure sources to the outlet, said shaft having a torsional compliance which causes said shaft to twist between said valve operating lever and said oscillatable member upon movement of the oscillatable member in either direction from its centered position, said torsional twist of said shaft being of a magnitude to mechanically damp out small amplitude high frequency input movements from said lever and the oscillatable member to hold it in its centered position during normal road movements.

4. A vehicle leveling system comprising a load leveler unit with first and second portions adapted to be connected between sprung and unsprung portions of the vehicle, means including said first and second portions of said leveler unit for defining a variable volume control chamber therein, a pressure source of fluid for supplying the control chamber, a height responsive control valve having a housing adapted to be connected to one of the sprung or unsprung masses of the vehicle, said housing having a cavity therein with cavity walls having a first arcuate segment thereon, a flexible tube within said cavity being supported in juxtaposed relationship with the cavity wall, a divider within said cavity, one end of said tube extending from the cavity on one side of the separator and the other end of said tube extending from the cavity on the other side of said divider, an outlet fitting from said cavity in communication with said tube between said first and second ends, said tube having a uniform cross section along portions thereof in juxtaposed relationship with said cavity wall and being formed of yieldable elastic material, a valve actuating lever, means for connecting one end of said valve actuating lever to the other of the sprung or unsprung masses, a torsion shaft extending through said housing having one end thereof rigidly connected to the other end of said lever, an arm in said cavity having angularly spaced legs joined together at a juncture, means for fixedly securing said juncture to the other end of said torsion shaft, said arms each having rollers secured thereon at a point in engagement with the outer surface of said tube, said rollers having centers with a path eccentric to that of said cavity walls, said shaft having a first centered position when the vehicle is level wherein each of said rollers squeeze a portion of the tube between the rollers and the cavity wall, said arm being movable by said shaft when the vehicle is below a desired height relationship to cause the arm to move one of the rollers in a direction away from the cavity wall while moving the other of the rollers along the tube to maintain it closed between said other roller and the wall to open communication between one pressure source with the outlet thereto, said arm being movable in an opposite direction of rotation when the vehicle is unloaded to cause the one of said rollers to close the tube against the wall of the cavity while moving the other of the rollers away from the wall of the cavity to open the other end of the tube to communicate the other pressure source with the outlet while closing the outlet to the one pressure source, said shaft having a torsional compliance to cause the shaft to twist without movement of the arm when it is in its centered position within the cavity and subjected to normal vehicle road movements.

* * * * *